(12) United States Patent
Ehde

(10) Patent No.: US 8,261,403 B2
(45) Date of Patent: Sep. 11, 2012

(54) BEAM BLADE WINDSHIELD WIPER ASSEMBLY

(75) Inventor: Dan Ehde, Ortonville, MI (US)

(73) Assignee: Trico Products Corporation, Rochester Hills, MI (US)

( * ) Notice: Subject to any disclaimer, the term of this patent is extended or adjusted under 35 U.S.C. 154(b) by 331 days.

(21) Appl. No.: 12/779,278

(22) Filed: May 13, 2010

(65) Prior Publication Data

US 2011/0277264 A1 Nov. 17, 2011

(51) Int. Cl.
*A47L 1/00* (2006.01)
*B60S 1/02* (2006.01)

(52) U.S. Cl. .............. 15/250.32; 15/250.43; 15/250.351

(58) Field of Classification Search ............... 15/250.32, 15/250.201, 250.43, 250.361, 250.351, 250.44, 15/250.31

See application file for complete search history.

(56) References Cited

U.S. PATENT DOCUMENTS

| | | | |
|---|---|---|---|
| 2,589,339 A | 3/1952 | Carson | |
| 2,616,112 A | 11/1952 | Smulski | |
| 2,643,411 A | 6/1953 | Nesson | |
| 2,799,887 A | 7/1957 | Nemic | |
| 2,801,436 A | 8/1957 | Scinta | |
| 2,814,820 A | 12/1957 | Elliott et al. | |
| 2,932,843 A | 4/1960 | Zaiger et al. | |
| 2,937,393 A | 5/1960 | Brueder | |
| 2,946,078 A | 7/1960 | Deibel et al. | |
| 2,974,341 A | 3/1961 | Hart | |
| 3,029,460 A | 4/1962 | Hoyler | |
| 3,037,233 A | 6/1962 | Peras et al. | |
| 3,056,991 A | 10/1962 | Smithers | |
| 3,082,464 A | 3/1963 | Smithers | |
| 3,088,155 A | 5/1963 | Smithers | |
| 3,089,174 A | 5/1963 | Bignon | |
| 3,104,412 A | 9/1963 | Hinder | |
| 3,132,367 A | 5/1964 | Wise | |
| 3,147,507 A | 9/1964 | Glynn | |
| 3,179,969 A | 4/1965 | Glynn | |
| 3,192,551 A | 7/1965 | Appel | |
| 3,234,578 A | 2/1966 | Golub et al. | |
| 3,296,647 A | 1/1967 | Gumbleton | |
| 3,317,945 A | 5/1967 | Ludwig | |
| 3,317,946 A | 5/1967 | Anderson | |
| 3,350,738 A | 11/1967 | Anderson | |
| 3,378,874 A | 4/1968 | Scinta | |
| D211,570 S | 7/1968 | Tomlin | |
| 3,418,679 A | 12/1968 | Barth et al. | |
| 3,480,986 A | 12/1969 | Forster | |

(Continued)

FOREIGN PATENT DOCUMENTS

DE 1028896 4/1958

(Continued)

*Primary Examiner* — Brian Glessner
*Assistant Examiner* — Brian D Mattei
(74) *Attorney, Agent, or Firm* — Bliss McGlynn, P.C.

(57) ABSTRACT

The present invention is directed to a wiper blade system that includes a wiper blade assembly having a wiping element, at least one elongated beam and a carrier that is operatively engaged to the elongated beam. The wiper blade assembly further includes an airfoil and a coupler assembly having a coupler and an adapter that is removably attached to the coupler. The coupler is removably secured the carrier and includes a corridor having a cross member extending therethrough that operatively receives the adapter. Together, the coupler and adapter facilitate mounting the wiper blade assembly to wiper arms having different wiper arm attachment members.

16 Claims, 8 Drawing Sheets

U.S. PATENT DOCUMENTS

| | | | |
|---|---|---|---|
| 3,588,942 A | 6/1971 | Schlesinger | |
| 3,618,155 A | 11/1971 | Mower | |
| 3,641,614 A | 2/1972 | Newsome | |
| 3,665,544 A | 5/1972 | Sakamoto | |
| 3,673,631 A | 7/1972 | Yamadai et al. | |
| 3,685,086 A | 8/1972 | Froehlich | |
| 3,751,754 A | 8/1973 | Quinlan et al. | |
| 3,780,395 A | 12/1973 | Quinlan et al. | |
| 3,845,519 A | 11/1974 | Quinlan et al. | |
| 3,862,465 A | 1/1975 | Ito | |
| 3,872,537 A | 3/1975 | Biachi | |
| 3,879,793 A | 4/1975 | Schlegel | |
| 3,881,214 A | 5/1975 | Palu | |
| 4,028,770 A | 6/1977 | Appel | |
| 4,063,328 A | 12/1977 | Arman | |
| 4,083,642 A | 4/1978 | Journee | |
| 4,102,003 A | 7/1978 | Hancu | |
| 4,127,916 A | 12/1978 | van den Berg et al. | |
| 4,132,490 A | 1/1979 | Journee | |
| 4,158,513 A | 6/1979 | Journee | |
| 4,224,001 A | 9/1980 | Arndt et al. | |
| 4,300,259 A | 11/1981 | Maiocco | |
| 4,309,790 A | 1/1982 | Bauer et al. | |
| 4,339,839 A | 7/1982 | Knights | |
| 4,343,063 A | 8/1982 | Batt | |
| D267,939 S | 2/1983 | Duvoux | |
| D268,020 S | 2/1983 | Duvoux | |
| 4,400,845 A | 8/1983 | Noguchi et al. | |
| 4,416,032 A | 11/1983 | Mohnach et al. | |
| 4,422,207 A | 12/1983 | Maiocco et al. | |
| 4,438,543 A | 3/1984 | Noguchi et al. | |
| 4,464,808 A | 8/1984 | Berry | |
| 4,547,925 A | 10/1985 | Blackborow et al. | |
| 4,561,143 A | 12/1985 | Beneteau | |
| 4,570,284 A | 2/1986 | Verton | |
| 4,587,686 A | 5/1986 | Thompson | |
| 4,590,638 A | 5/1986 | Beneteau | |
| 4,741,071 A | 5/1988 | Bauer et al. | |
| 4,766,636 A | 8/1988 | Shinpo | |
| 4,782,547 A | 11/1988 | Mohnach | |
| 4,807,326 A | 2/1989 | Arai et al. | |
| 4,852,206 A | 8/1989 | Fisher | |
| D307,408 S | 4/1990 | Mower et al. | |
| D308,660 S | 6/1990 | Fisher | |
| D308,845 S | 6/1990 | Charet et al. | |
| 4,976,001 A | 12/1990 | Wright | |
| 4,980,944 A | 1/1991 | Longman | |
| 4,984,325 A | 1/1991 | Arai et al. | |
| 4,989,290 A | 2/1991 | Hoshino | |
| 5,042,106 A | 8/1991 | Maubray | |
| 5,056,183 A | 10/1991 | Haney, III | |
| 5,062,176 A | 11/1991 | Unterborn et al. | |
| 5,084,933 A | 2/1992 | Buechele | |
| 5,086,534 A | 2/1992 | Journee | |
| 5,093,954 A | 3/1992 | Kuzuno | |
| 5,123,140 A | 6/1992 | Raymond | |
| 5,138,739 A | 8/1992 | Maubray | |
| 5,168,596 A | 12/1992 | Maubray | |
| 5,168,597 A | 12/1992 | Schoen et al. | |
| 5,170,527 A | 12/1992 | Lyon, II | |
| 5,179,761 A | 1/1993 | Buechele et al. | |
| 5,206,969 A | 5/1993 | Patterson et al. | |
| 5,218,735 A | 6/1993 | Maubray | |
| 5,228,167 A | 7/1993 | Yang | |
| 5,233,721 A | 8/1993 | Yang | |
| 5,257,436 A | 11/1993 | Yang | |
| 5,276,937 A | 1/1994 | Lan | |
| 5,283,925 A | 2/1994 | Maubray | |
| 5,307,536 A | 5/1994 | Lescher | |
| 5,311,636 A | 5/1994 | Lee | |
| 5,319,826 A | 6/1994 | Mower | |
| 5,325,564 A | 7/1994 | Swanepoel | |
| 5,332,328 A | 7/1994 | Yang | |
| 5,383,249 A | 1/1995 | Yang | |
| 5,392,487 A | 2/1995 | Yang | |
| 5,392,489 A | 2/1995 | Mohnach | |
| 5,454,135 A | 10/1995 | Okuya et al. | |
| 5,463,790 A | 11/1995 | Chiou et al. | |
| 5,485,650 A | 1/1996 | Swanepoel | |
| 5,509,166 A | 4/1996 | Wagner et al. | |
| 5,553,962 A | 9/1996 | Eustache | |
| 5,606,765 A | 3/1997 | Ding | |
| 5,611,103 A | 3/1997 | Lee | |
| 5,618,124 A | 4/1997 | Chen | |
| 5,632,059 A | 5/1997 | Lee | |
| 5,724,700 A | 3/1998 | Marks | |
| 5,807,016 A | 9/1998 | Herring et al. | |
| 5,885,023 A | 3/1999 | Witek et al. | |
| 5,937,474 A | 8/1999 | Hussaini | |
| 5,946,764 A | 9/1999 | Tworzydlo | |
| 6,000,093 A | 12/1999 | Charng | |
| 6,158,078 A | 12/2000 | Kotlarski | |
| 6,161,249 A | 12/2000 | Hussaini | |
| 6,279,191 B1 | 8/2001 | Kotlarski et al. | |
| 6,292,974 B1 | 9/2001 | Merkel et al. | |
| 6,332,236 B1 | 12/2001 | Ku | |
| 6,353,962 B1 | 3/2002 | Matsumoto et al. | |
| 6,434,780 B1 | 8/2002 | Kotlarski | |
| 6,523,218 B1 | 2/2003 | Kotlarski | |
| 6,550,096 B1 | 4/2003 | Stewart et al. | |
| 6,553,607 B1 | 4/2003 | De Block | |
| 6,581,237 B1 | 6/2003 | Kotlarski | |
| 6,591,445 B2 | 7/2003 | Nacamuli | |
| 6,599,051 B1 | 7/2003 | Jarasson | |
| 6,611,988 B1 | 9/2003 | De Block | |
| 6,625,842 B1 | 9/2003 | De Block | |
| 6,634,056 B1 | 10/2003 | De Block | |
| 6,654,983 B1 | 12/2003 | Raynaud | |
| 6,665,905 B2 | 12/2003 | Wegner et al. | |
| 6,668,419 B1 | 12/2003 | Kotlarski | |
| 6,675,433 B1 | 1/2004 | Stewart et al. | |
| 6,675,434 B1 | 1/2004 | Wilhelm et al. | |
| 6,687,948 B2 | 2/2004 | Kotlarski | |
| 6,779,223 B1 | 8/2004 | Roekens | |
| 6,789,289 B2 | 9/2004 | Roodt | |
| 6,792,644 B2 | 9/2004 | Roodt | |
| 6,836,924 B2 | 1/2005 | Egan-Walter | |
| 6,836,926 B1 | 1/2005 | De Block | |
| 6,944,905 B2 | 9/2005 | De Block et al. | |
| 6,966,096 B2 | 11/2005 | Bascotto et al. | |
| 7,028,368 B2 | 4/2006 | Lee et al. | |
| 7,150,066 B1 | 12/2006 | Huang | |
| 7,207,082 B2 | 4/2007 | Lee | |
| 7,228,588 B2 | 6/2007 | Kraemer et al. | |
| 7,281,294 B2 | 10/2007 | Wilms et al. | |
| 7,451,520 B2 | 11/2008 | Weiler et al. | |
| 7,546,660 B2 | 6/2009 | Heinrich et al. | |
| 7,581,279 B2 | 9/2009 | Baseotto et al. | |
| 7,621,016 B2 | 11/2009 | Verelst et al. | |
| 2002/0174505 A1* | 11/2002 | Kim | 15/250.32 |
| 2005/0028312 A1* | 2/2005 | Coughlin | 15/250.32 |
| 2006/0130263 A1 | 6/2006 | Coughlin | |
| 2008/0086830 A1* | 4/2008 | Kim | 15/250.32 |
| 2009/0199357 A1 | 8/2009 | Thienard | |

FOREIGN PATENT DOCUMENTS

| | | |
|---|---|---|
| DE | 1247161 | 8/1967 |
| DE | 1505397 | 10/1969 |
| DE | 1655410 | 8/1971 |
| DE | 2311293 | 9/1974 |
| DE | 2336271 | 2/1975 |
| DE | 2350302 | 4/1975 |
| DE | 2353368 | 5/1975 |
| DE | 2640399 | 3/1977 |
| DE | 19729865 A1 | 1/1999 |
| DE | 19734843 A1 | 2/1999 |
| DE | 19814609 A1 | 10/1999 |
| DE | 10335393 A1 | 9/2004 |
| EP | 0594451 A1 | 4/1994 |
| FR | 1069875 | 2/1954 |
| FR | 2377302 | 8/1978 |
| FR | 2515121 | 4/1983 |
| GB | 878951 | 10/1961 |
| GB | 1012902 | 12/1965 |
| GB | 1395918 | 5/1975 |
| GB | 2308542 A | 7/1997 |
| WO | 0021809 | 4/2000 |

| WO | 02087935 A1 | 11/2002 |
| WO | 03051696 A1 | 6/2003 |
| WO | 03080409 A1 | 10/2003 |
| WO | 2004048163 A1 | 6/2004 |
| WO | 2004076251 A1 | 9/2004 |
| WO | 2004076252 A1 | 9/2004 |
| WO | 2006069648 A1 | 7/2006 |
| WO | 2009133979 A1 | 11/2009 |

* cited by examiner

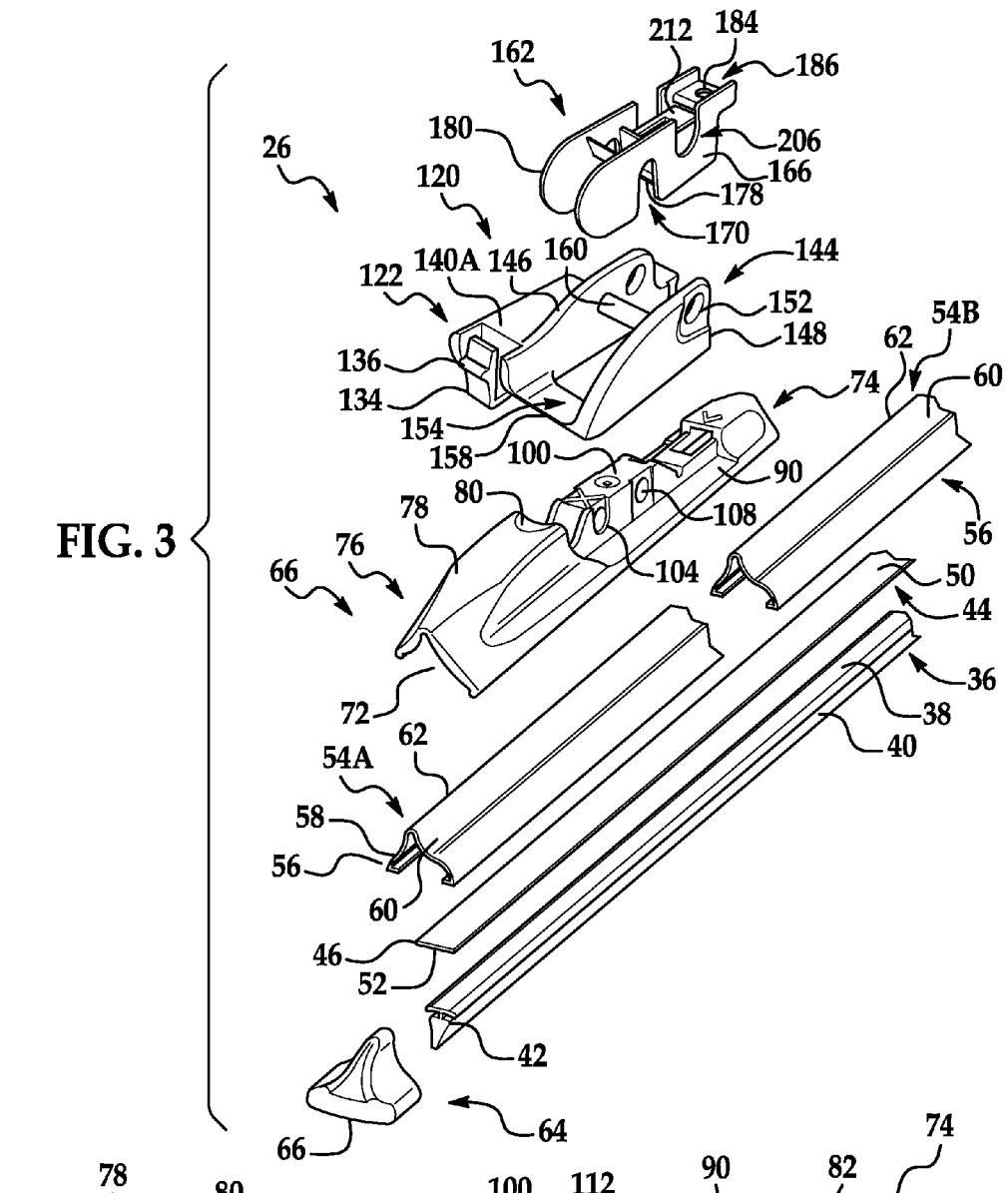

BEAM BLADE WINDSHIELD WIPER ASSEMBLY

BACKGROUND OF THE INVENTION

1. Field of the Invention

The present invention relates, generally, to windshield wiper assemblies. More specifically, the present invention relates to a beam blade windshield wiper assembly having a universal coupler assembly for use in connecting a beam blade wiper to various styles of wiper arms.

2. Description of the Related Art

Windshield wipers known in the related art include two categories commonly referred to as, "tournament" wipers and "beam blade" style wipers. In either category, the windshield wiper assembly is removably connected to the wiper arm of a vehicle. Specifically, a wiper coupler is employed to facilitate the connection between the windshield wiper assembly and the attachment member of the wiper arm.

At the manufacturing level, there is usually not much concern over compatibility between the wiper assemblies and the wiper arm since these components are typically supplied to OEM vehicle manufacturers as a part of an overall wiper system. However, windshield wiper assemblies wear out and must be replaced. Typically, the wiper coupler for a beam blade windshield wiper assembly is designed solely for use in connection with a single style of wiper arm attachment member. In the aftermarket, compatibility between the wiper arm and windshield wiper assembly is a problem. End users are provided with few, if any, options for replacement wiper assemblies and are often required to purchase replacement wiper assemblies from dealerships for the OEM vehicle manufacturer.

As a result of the limited aftermarket availability and limited options associated with beam blade windshield wipers, there is a need in the art for a beam blade windshield wiper assembly having a coupler subassembly that operatively couples a beam blade windshield wiper to several different wiper arm attachment members.

SUMMARY OF THE INVENTION

The present invention overcomes many limitations and disadvantages in the related art of beam blade windshield wiper assemblies incorporating wiper couplers for use in connecting a beam blade windshield wiper assembly to a wiper arm. To this end, the windshield wiper system of the present invention includes a wiper blade assembly having a wiping element that contacts the surface to be wiped, at least one elongated beam having longitudinal ends that define a predetermined length and a carrier that is operatively engaged to the elongated beam. The wiper blade assembly further includes an airfoil that is operatively disposed adjacent to the carrier and adapted to operatively connect the elongated beam and the wiping element. The wiper blade assembly also includes a coupler assembly having a coupler that is adapted to operatively engage the carrier and an adapter that is removably attached to the coupler. The coupler includes a tab and a locking tang that cooperate to removably secure the coupler to the carrier and a corridor having a cross member extending therethrough that operatively receives the adapter. The adapter includes a pair of sidewalls, each having a nock including an arcuate rest and at least one locking member that releasably engage said cross member. Each of the sidewalls further includes a notch aligned with respect to each other and a land that extends between the sidewalls to define a channel therebetween. The adapter further includes a cantilevered beam extending between the sidewalls in parallel relation to the land and a super-surface that cooperates with the sidewalls and the land to define an elongate passage. The channel and the elongate passage cooperate to operatively receive at least one style of a first hook-type wiper arm attachment member. The cantilevered beam further includes a sub-surface that cooperates with the sidewalls to define an elongate track where the channel and the elongate track cooperate to operatively receive at least one style of a second hook-type wiper arm attachment member. The adapter also includes a substrate extending between the sidewalls that are disposed in parallel relation to and juxtaposed between the land and the cantilevered beam. The substrate cooperates with the land and the notches to receive at least two different diameter pin-type wiper arm attachment members and further cooperates with the sidewalls and the land to define an elongate cavity adapted to operatively receive at least one style bayonet-type wiper arm attachment member.

Thus, one advantage of the present invention is that the beam blade wiper assembly operatively engages a wiper arm attachment member that was typically, exclusively used in connection with tournament-style wiper blade assemblies.

Another advantage of the present invention is that the universal wiper coupler assembly provides a beam blade windshield wiper assembly as a replacement option to tournament-style windshield wiper blade assemblies, thereby increasing the options of available replacement windshield wiper assemblies to the end users.

Still another advantage of the present invention is that it provides a beam blade windshield wiper assembly that is adapted to releasably engage several different wiper arm attachment members, thereby reducing the need for several different windshield wiper assemblies at the OEM level.

Yet another advantage of the present invention is that it provides a beam blade windshield wiper assembly that is adapted for use in connection with several different wiper arm attachment members, thereby increasing the availability of beam blade windshield wiper assemblies in the aftermarket.

Other objects, features and advantages of the present invention will be readily appreciated as the same becomes better understood after reading the subsequent description taken in connection with the accompanying drawings.

BRIEF DESCRIPTION OF THE DRAWINGS

FIG. 3 is an exploded view of the windshield wiper assembly in accordance with the present invention.

FIG. 4 is a top view of the carrier of the windshield wiper assembly in accordance with the present invention.

DETAILED DESCRIPTION OF THE PREFERRED EMBODIMENT(S)

Figure 1:
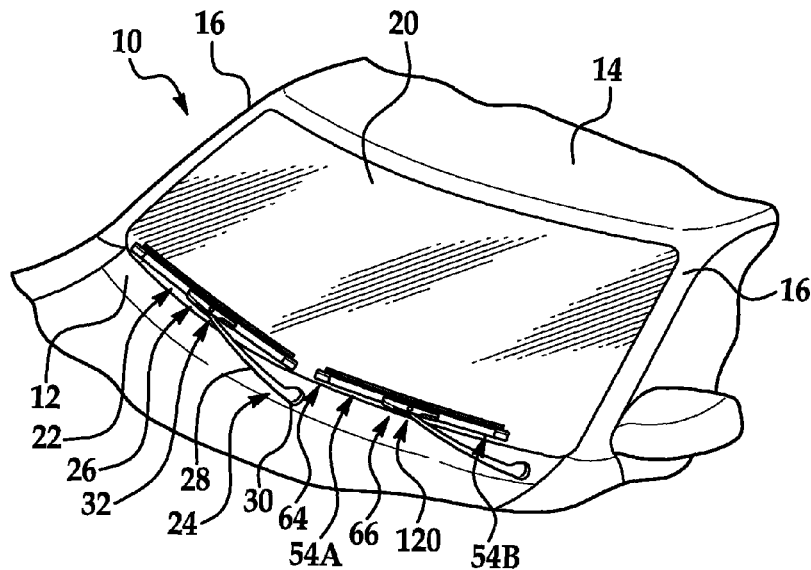
FIG. 1 is a partial perspective view of the front of an automotive vehicle having a pair of windshield wiper assemblies in accordance with the present invention that are pivotally mounted for reciprocal movement across the windshield of the vehicle.

Referring now to the figures, where like numerals are used to designate like structure, a portion of a vehicle is schematically illustrated at 10 in FIG. 1. The vehicle includes a cowl 12, a roof 14, and a pair of laterally spaced front or "A" pillars 16 extending between the roof 14 and the cowl 12. The A-pillars 16, roof 14, and cowl 12 cooperate to support a curved or "swept back" glass windshield 20 located therebetween.

A wiper system is generally indicated at 22 in FIG. 1 and is employed to clean the glass windshield 20. The wiper system 22 includes a wiper arm, generally indicated at 24 and a beam blade windshield wiper assembly of the present invention, generally indicated at 26, (hereinafter referred to as a "wiper assembly"). The wiper assembly 26 is releasably engaged to the wiper arm 24 and adapted to clean the surface to be wiped, namely a windshield 20. Those having ordinary skill in the art will appreciate that a wiper system 22 may include more than wiper arm 24 and wiper assembly 26. By way of example and as indicated in FIG. 1, a wiper system 22 includes a pair of wiper arms 24 and wiper assemblies 26, which correspond to the driver and passenger side of the vehicle 10. Furthermore, those having ordinary skill in the art will appreciate, that wiper assemblies 26 may be employed in other areas of a vehicle 10, such as a rear window (not shown) or a head lamp (not shown) that employs a wiper system 20. Thus, it will be understood that the present invention is not limited for use solely in connection with wiper arms 24 adjacent to a vehicle's windshield 20, but for use in all applications where wiper assemblies 26 are employed.

The wiper arm 24 includes an elongate body 28 having a pivot end 30 that is operatively engaged to a motor (not shown) that drives the wiper arm 24 in an oscillating manner across the windshield 20. More specifically, the elongate body 28 is operatively attached to the pivot end 30 in a hinged manner to enable a person to elevate the elongate body 28 away from the windshield 20. Articulation between the pivot end 30 and elongate body 28 in this manner is conventionally known to enable maintenance or inspection of the wiper system 22 and/or windshield 18 as well as for removal and installation of wiper assemblies 26. Those having ordinary skill in the art will appreciate that the wiper arm 24 may further include a biasing member to impart a downward force through the wiper arm 24 and onto the wiper assembly 26 to facilitate contact between the wiper assembly 26 and the windshield 20 of the vehicle 10. By way of example, the biasing member may include a spring. It should further be appreciated that the elongate body 28 of the wiper arm 24 may include a cavity adjacent to the pivot end 30 to operatively receive the biasing member.

Figure 14A:
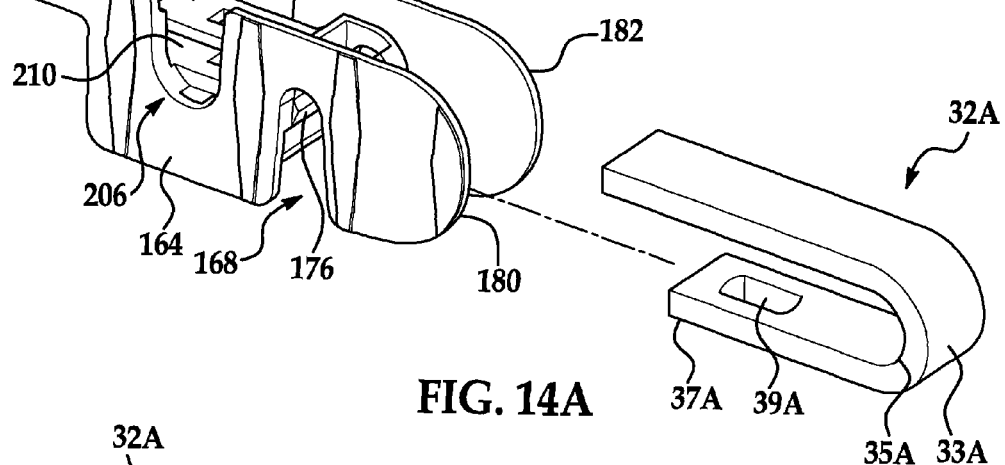
FIG. 14A is an assembly view of the adapter portion of the coupler assembly in accordance with the present invention illustrating the contact location for a first hook-type wiper arm attachment member.

As shown in FIGS. 1, 14A-17B, the wiper arm 24 further includes an attachment member, generally indicated at 34, that extends from the elongate body 28. FIGS. 14A and 14B show a "pin-type" attachment member 34A while FIGS. 15A and 15B show a "bayonet-type" attachment member 34B and FIGS. 16A and 16b, 17A and 17B show first and second "hook-type" attachment members 34C and 34D. Pin-type, bayonet-type and hook-type attachment members 34A-34D have been traditionally employed exclusively for connection to a "tournament" style windshield wiper assembly. However, the present invention provides a beam blade windshield wiper assembly 26 as a replacement option for use in connection with wiper arm attachment members that traditionally connect to tournament style windshield wiper assemblies.

Figure 2:
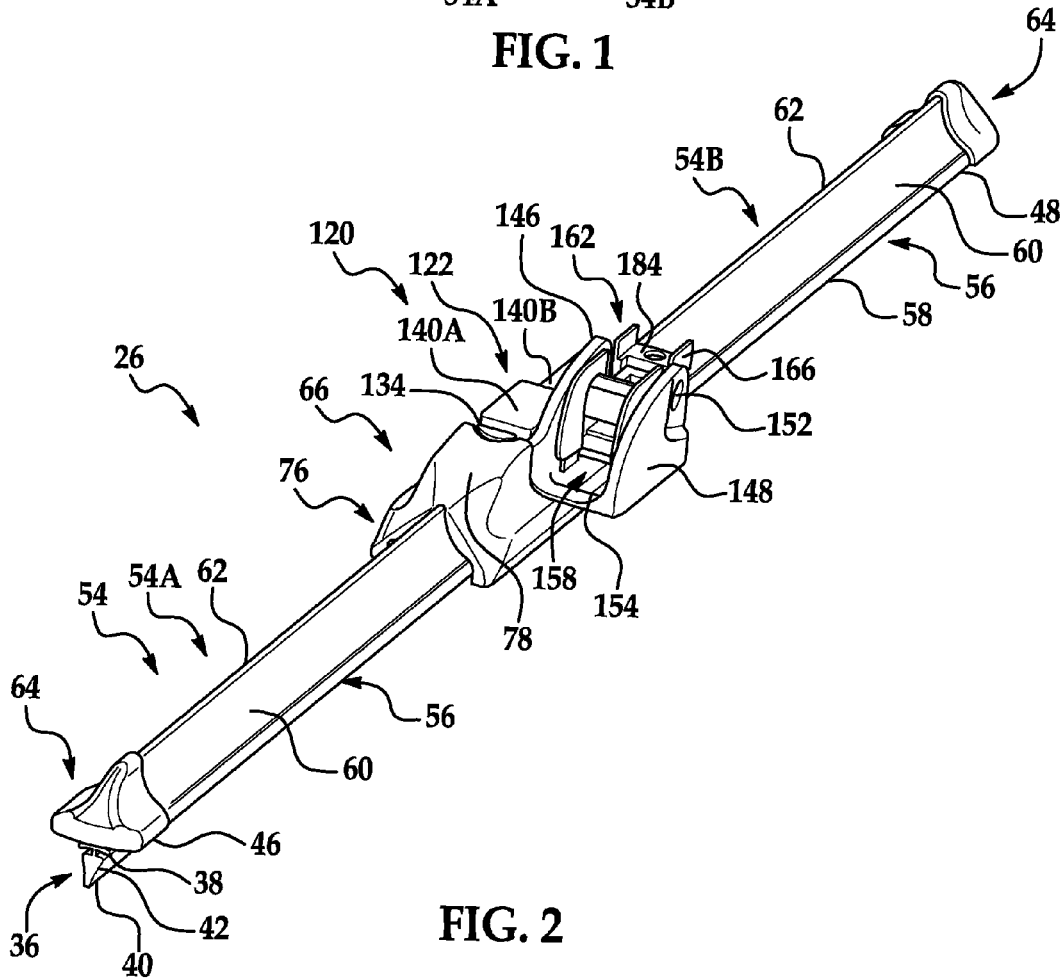
FIG. 2 is a perspective view of the windshield wiper assembly in accordance with the present invention.
Figure 5:
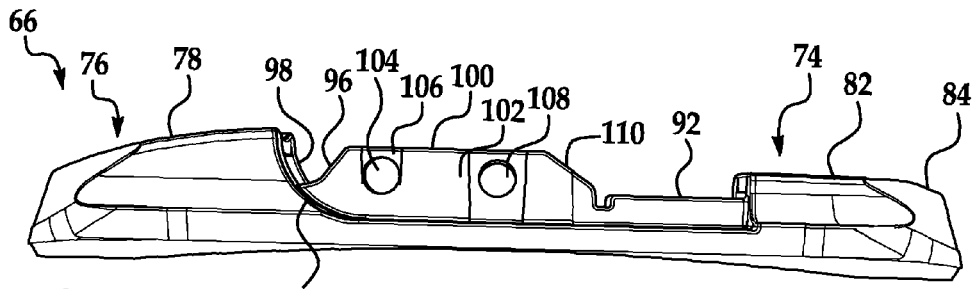
FIG. 5 is a side view of the carrier of the windshield wiper assembly in accordance with the present invention.
Figure 6:
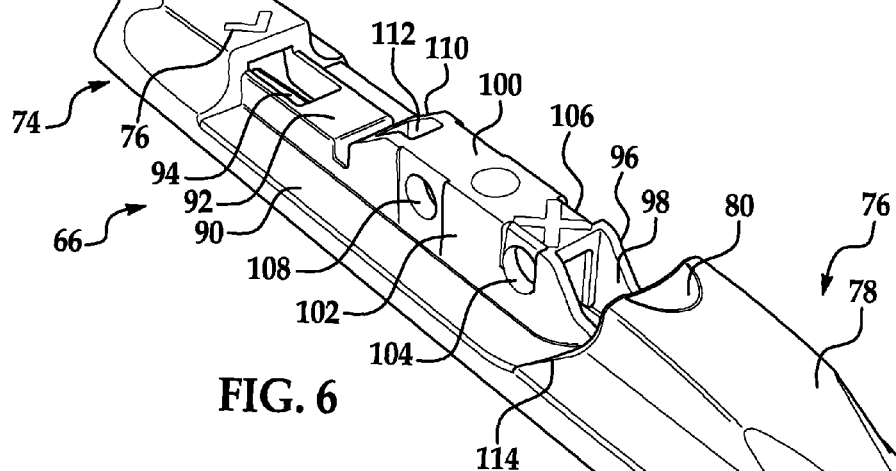
FIG. 6 is a top perspective view of the carrier of the windshield wiper assembly in accordance with the present invention.

Referring to FIGS. 1-3, the wiper assembly 26 includes a wiping element, generally indicated at 36, that is adapted to contact the surface of the vehicle 10 to be wiped, in this representative example, the windshield 20. The wiping element 36 includes an upper section 38 and a lower section 40 that are segmented by a longitudinally extending partition 42. The partition 42 provides flexibility between the upper section 38 and lower section 40 during operational movement of the wiper assembly 24. The upper section 38 is adapted to facilitate attachment to additional components of the wiper assembly 26, as described in greater detail below, while the lower section 40 is adapted to engage the surface to be wiped.

The wiping element 36 includes a predetermined length and cross-sectional profile corresponding to a particular application and is typically manufactured through an extrusion process, which enables the length and cross-sectional profile of the wiping element 36 to be easily adjusted without a substantial increase to manufacturing expense. Furthermore, while the wiping element 36 of the present invention is constructed from a flexible rubber. Those having ordinary skill in the art will appreciate that the wiping element 36 may be constructed from any flexible material, such as silicone or other polymer, and via any manufacturing process, such as injecting molding, without departing from the scope of the invention.

The wiper assembly 26 of the present invention further includes an elongated beam, generally indicated at 44, that operatively engages the wiping element 36. The elongated beam 44 is adapted to distribute downward pressure from the wiper arm 24 across the wiping element 36. As a result, the elongated beam 44 includes longitudinal ends 46 and 48 that define a predetermined length capable of facilitating distribution of the downward pressure from the wiper arm assembly 24. The elongated beam 44 further includes a top end 50 and a bottom end 52 disposed between the longitudinal ends 46 and 48. In the embodiment illustrated in the figures, the wiping element 36 is operatively engaged to the bottom end 52 of the elongated beam 44 by an adhesive/epoxy. However, those having ordinary skill in the art will appreciate that the elongated beam 44 may be operatively engaged to the wiping element 36 by other methods such as through a slot defined within the elongated beam 44 that receives a portion of the wiping element 36. Furthermore, those having ordinary skill in the art will appreciate that the wiper assembly 26 of the present invention may include more than one elongated beam 44 that is operatively engaged to the wiping element 36.

The elongated beam 44 may be constructed from any resiliently flexible material, such as spring steel or a polymer, that facilitates the application of force from the spring-loaded wiper arm 24 across the span of the elongated beam 44 toward the first and second longitudinal ends 46 and 48. To that end, the elongated beam 44 may be curved longitudinally with a predetermined radius of curvature that is the same as or greater than the plane of curvature of the windshield 20. This predetermined radius of curvature is sometimes referred to in the related art as a "free form" radius of curvature (hereinafter "windshield curvature"). Accordingly, the curvature of the elongated beam 44 may be symmetrical or asymmetrical depending on the force requirements and the contour of the windshield 20. The flexible, free form, pre-curved elongated beam 44 straightens out when the wiper arm 24 applies a force thereto to flatten the elongated beam 44 and direct the wiping element 36 to contact the windshield 20. Thus, the elongated beam 44 includes a free-form curvature that ensures force distribution on windshields having various curvatures that effects proper wrapping about the windshield 20.

The elongated beam 44 includes a substantially constant thickness and may have a constant width throughout the length between the first and second longitudinal ends 46 and 48. The constant thickness is adapted to provide high lateral and torsional stiffness to avoid lateral and torsional deflection, which causes the wiping element 36 to stick/slip ("chatter") on the windshield 20 during operation. Thus, the cross-section of the elongated beam 44 is substantially uniform, which makes it easier to manufacture. More specifically, where the elongated beam 44 is constructed from metal, such as spring steel, the tools and machinery used to manufacture the elongated beam 44 are less complicated than that required to manufacture a beam 44 having a varying thickness. Furthermore, where the elongated beam 44 is constructed from a polymer, such as a thermoplastic elastomer, the tools and extrusion process machinery are also less complicated than those employed to manufacture an elongated beam having a varying thickness. However, those having ordinary skill in the art will appreciate that the elongated beam 44 illustrated herein may include a varying thickness and/or outer profile (width) without departing from the scope of the invention. By way of example, the width and/or thickness of the elongated beam 44 may taper linearly from the beam center, sinusoidally, parabolically, or asymmetrically. Additionally, the elongated beam 44 illustrated throughout the figures is a single, integral piece of material such that it defines a solid cross-section. However, those having ordinary skill in the art will appreciate that the elongated beam 44 may be formed into a single piece or multiple pieces using a plurality of laminates.

The wiper assembly 26 of the present invention further includes an airfoil, generally indicated at 54, to reduce the likelihood of wind lift during operational movement across the surface to be wiped. The airfoil 44 includes two segments 54A and 54B that include identical structure. Accordingly, the same reference numerals will be used to describe the structure of the two segments 54A and 54B of the airfoil 54. However, those having ordinary skill in the art will appreciate that the airfoil 54 may also be constructed as a single unit.

The airfoil 54 includes a base, generally indicated at 56. The base 56 includes an attachment portion 58 that engages the elongated beam 44. More specifically, the attachment portion 58 of each of the segments 54A and 54B engage a portion of the top end 50 and bottom end 52 between the longitudinal ends 46 and 48, thereby joining the airfoil 54, wiping element 36 and elongated beam 44 together. Those having ordinary skill in the art will appreciate that the airfoil 54, elongated beam 44 and wiping element 36 may be joined together through other means such as bonding the airfoil 54 to the top end 50 of the elongated beam 44 via adhesive/epoxy or by employing additional structure such as a retainer or spline that couples the wiping element 36 to the elongated beam 44 or the elongated beam 44 to the airfoil 54 without departing from the scope of the invention.

The airfoil 54 further includes a spoiler 60 that is adapted to utilize airflow to increase downward force on to the wiper assembly 26 during operational movement across the surface to be wiped. To this end, the spoiler 60 tapers inwardly from the base 56 toward a terminal point 62 to define a profile that is slightly contoured. As shown in FIGS. 2 and 3, the profile of the spoiler 60 is substantially symmetrical in cross-section. However, those having ordinary skill in the art will appreciate that the spoiler 60 may include an asymmetrical cross-sectional profile without departing from the scope of the invention. Additionally, those having ordinary skill in the art will appreciate that the airfoil 54 may include a solid-core spoiler 60 or a hollow-core spoiler 60 without departing from the scope of the invention. The airfoils 54A and 54B of the present invention are manufactured from a thermoplastic material and using a manufacturing process that may be the same as described above relative to the wiping element 36. However, it should be appreciated that the airfoils 54 may be manufactured using a different process and/or different material. By way of example, the airfoils 54 may be manufactured via an injection molding process using a polymer composition having greater hydrophobic properties than the materials used for manufacturing the wiping element 36.

The wiper assembly 26 of the present invention further includes a pair of end caps, generally indicated at 64. The end caps 64 are adapted to operatively engage the airfoil 54. The end caps 64 include a profile that substantially mimics the contours of the airfoil 54 to maintain the wind lift characteristics of the wiper assembly 26 and to provide an increased aesthetic value. The end caps 64 include a closed end 66 that covers the longitudinal ends 46 and 48 of the elongated beam 44. The closed end 66 prevents infiltration of water, ice, and debris between the elongated beam 44 and the airfoil 54, which may prevent proper operation of the wiper assembly 26. The closed end 66 of the end caps 64 may be adapted to extend beyond the longitudinal ends 46 and 48 of the elongated beam 44 to facilitate contact between the outer extremities of the wiping element 26 and the surface to be wiped. More specifically, the end caps 64 provide a mass increase adjacent to the longitudinal ends 46 and 48 of the elongated beam 44 that reduce the likelihood of localized chatter along the extremities of the wiping element 26 caused by the combination of wind lift and a decrease in the force distributed to this area from wiper arm 24 via the elongated beam 44, as described above.

The wiper assembly 26 further includes a carrier, generally indicated at 66, that is disposed along an intermediate position between the first and second airfoils 54A and 54B. Contrary to conventional beam blade-style wiper assemblies, which include a small contact point through which force from the wiper arm 24 is distributed, the carrier 66 of the present invention broadens the initial point through which force is applied from the wiper arm 24 to the elongated beam 44. In this manner, the downward force from the wiper arm 24 is distributed with more efficiency across the elongated beam 44, thereby reducing the likelihood of wind lift and improving wiping action.

Figure 7:
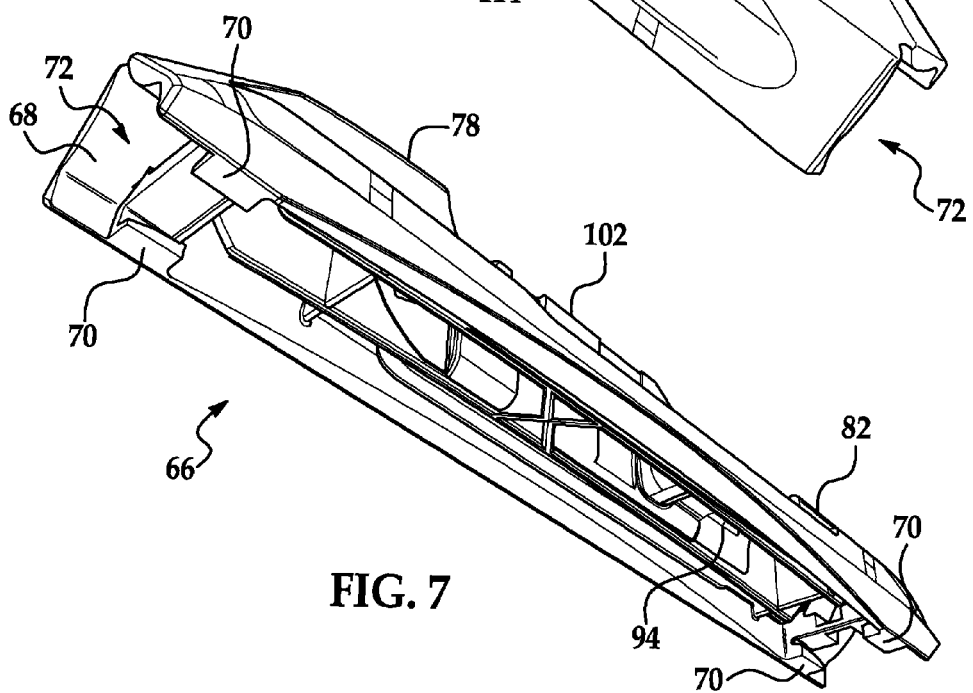
FIG. 7 is a bottom perspective view of the carrier of the windshield wiper assembly in accordance with the present invention.
Figure 8:
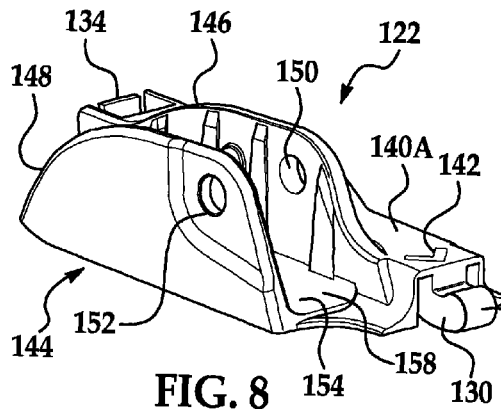
FIG. 8 is a back perspective view of the coupler portion of the coupler assembly in accordance with the present invention.

Referring to FIG. 7, the carrier 66 includes an interior surface 68 that is disposed in proximate relation to the elongated beam 44. The interior surface 68 includes a plurality of transversely extending tangs 70 that are adapted to operatively engage the bottom end 52 of the elongated beam 44. The tangs 70 cooperate with the remaining structure of the interior surface 68 to define a track, generally indicated at 72, that operatively receives an intermediate portion of the elongated beam 44. The interior surface 68 includes four transversely extending tangs 70 operatively disposed adjacent to the airfoil segments 54A and 54B to accommodate the resiliency of the elongated beam 44. In this manner, a portion of the elongated beam 44 is retained within the track 72, but remains able to flex in response to the curvature of the surface to be wiped.

It should be appreciated that the airfoil segments 54A and 54B restrict the axial movement of the carrier 66 relative to the elongated beam 44. However, those having ordinary skill in the art will appreciate that the tangs 70 may include additional structure to prevent axial movement between the carrier 66 and the elongated beam 44. By way of example, one or more of the tangs 70 may further include a post and the elongated beam 44 may include a corresponding detent that is adapted to receive the post to prevent such axial movement of the carrier 66 relative to the elongated beam 44. Those having ordinary skill in the art will appreciate that the elongated beam 44 may be operatively attached to the carrier 66 by several methods other than as described above. By way of example, the carrier 66 may be fixed by adhesive, riveted or welded to the elongated beam 44.

Referring to FIGS. 2-7, the carrier 66 further includes a low-profile end, generally indicated at 74, that is disposed adjacent to one of the airfoil segments 54A and a high-profile end, generally indicated at 76, that is disposed adjacent to the other airfoil segment 54B. The high-profile end 76 and the low-profile end 74 each include a contoured exterior that substantially corresponds to the contoured profile of the airfoil segments 54A and 54B. The high-profile end 76 includes an arcuate top surface 78 that tapers downwardly toward one of the airfoil segments 54B. The arcuate top surface 78 includes a depression 80 therein that will be described in greater detail below. The low-profile end 74 includes a substantially planar top surface 82 and an angled region 84 that tapers toward one of the airfoil segments 54A. The planar top surface 82 of the low-profile end 74 further includes an alignment member 86 defined thereon that will be described in greater detail below.

The carrier 66 further includes a saddle, generally indicated at 88. The saddle 88 is disposed between the high and low-profile ends 76 and 74, respectively. The saddle 88 is adapted to releasably engage a coupler assembly, that will be described in greater detail below. The saddle 88 includes a substrate 90 that extends between the high-profile end 76 and the low-profile end 74 and a back jockey 92 that extends vertically from the substrate 90 and adjacent to the low-profile end 74. The back jockey 92 includes an access 94 that enables a portion of a coupler assembly to be located adjacent to the track 72 of the carrier 66 within the low-profile end 74, as will be described in greater detail below. The saddle 88 further includes a front jockey 96 that extends vertically from the substrate 90, adjacent to the high-profile end 76. The front jockey 96 includes a gullet 98 that enables a portion of a coupler assembly to be located adjacent to the track 72 of the carrier 66 within the high-profile end 76, as will be described in greater detail below.

The saddle 88 further includes a seat 100 that is disposed between the front jockey 96 and the back jockey 92 and a skirt 102 that depends from the seat 100. The skirt 102 is adapted to provide an interference fit between the seat 100 and the coupler assembly, as will be described in greater detail below. The saddle 88 further includes a pair of blind bores 104 that are aligned with respect to each other on opposite sides of the skirt 102. The blind bores 104 are located in proximate relation to the front jockey 96. The saddle 88 further includes a recessed façade 106 that is located between the blind bores 104 and the seat 100. The recessed façade 106 is adapted to facilitate positive alignment of a portion of the coupler assembly to be received within the blind bores 104. A port 108 extends through the skirt 102 in proximate relation to the back jockey 92. The port 108 is adapted to receive a portion of a wiper arm attachment member that typically exclusively adapted for use in connection with a beam blade windshield wiper assembly. The seat 100 includes a cantle 110 that extends downwardly toward the back jockey 92. The cantle 110 includes a cut-out section 112 that is adapted to facilitate operative attachment to a coupler assembly and/or facilitate releasable engagement between a coupler assembly and a wiper arm attachment member. Additionally, the cantle 110 cooperates with the back jockey 92 to provide a pivot area wherein a coupler assembly is able to pivot without interference from the saddle 88. The saddle 88 further includes a pair of fenders 114 that are operatively disposed along opposite sides of the seat 100, adjacent to the front jockey 96. More specifically, the fenders 114 extend vertically from the substrate 90 along an arcuate path toward the high-profile end 76 and cooperate with the cantle 96 and back jockey 92 to enable a coupler assembly to pivot without interference.

Referring to FIGS. 2, 3, 8-13, the wiper assembly 26 of the present invention further includes a coupler assembly, generally indicated at 120. The coupler assembly 120 is adapted to facilitate removable attachment between the wiper assembly 20 and the attachment member 34. The coupler assembly 120 includes a coupler, generally indicated at 122. The coupler 122 is adapted to removably engage the carrier 66. More specifically, the coupler 122 includes leading portion, generally indicated at 124, having an undersection, generally indicated at 126, that operatively receives the saddle 88 of the carrier 66. The undersection 126 includes a leg 128 depending therefrom that is adapted to be received within a portion of the cutout section 112 of the cantle 110. The undersection 126 further includes a tab 130 extending outwardly therefrom that is adapted to be received through the access 94 to engage a portion of the track 72 adjacent to the low-profile end 74. The tab 130 includes a bulbous end 132 that is adapted to provide a friction-fit relative to the engagement with the track 72.

The undersection 126 further includes a locking tang 134 depending therefrom along the opposite side of the leading portion 124 relative to the tab 130. The locking tang 134 engages the gullet 98 adjacent to the high profile end 76 of the carrier 66. To this end, the locking tang 134 includes a lip 136 that engages the track 72 below the arcuate top surface 78. The lip 136 of the locking tang 134 and the tab 130 cooperate to lock the coupler 122 into attachment with the carrier 66. Furthermore, these components as well as the leg 128 cooperate to prevent axial movement between the coupler 122 and carrier 66. It should be appreciated by those having ordinary skill in the art that the locking tang 134 may be actuated by an end user to release the connection between the coupler 122 and the carrier 66.

Figure 9:
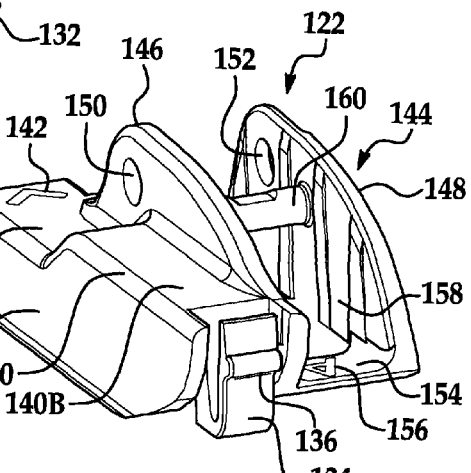
FIG. 9 is a front perspective view of the coupler portion of the coupler assembly in accordance with the present invention.
Figure 10:
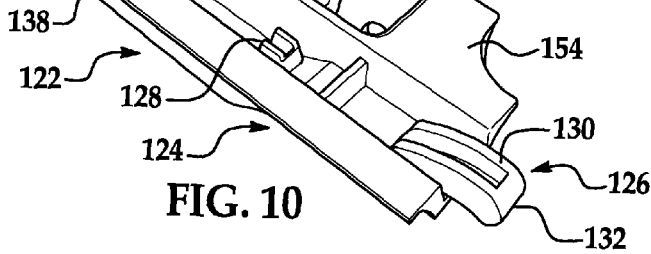
FIG. 10 is a bottom perspective view of the coupler portion of the coupler assembly in accordance with the present invention.

The leading portion 124 of the coupler 122 further includes a facing surface 138 that is oriented in a manner that faces the engine cowl 12 when the wiper assembly 26 is operatively engaged to a wiper arm 24. The facing surface 138 includes a radius profile that corresponds to the contoured exterior of the high profile end 76 and low profile end 74 of the carrier 66. The leading portion 124 further includes a merging surface 140 that is adapted to integrate the leading portion 124 with the trailing portion that will be described in greater detail below. The merging surface 140 includes a low end 140A and a high end 140B that are adapted to transition the leading portion 124 into the high-profile end 76 and low-profile end 74 of the carrier 66. As shown in FIG. 9, the locking tang 134 is disposed adjacent to the high end 140B. The merging surface 140 further includes a locating member 142 that corresponds with the alignment member 86 of the low profile end 74 to provide positive engagement between the coupler 122 and the carrier 66.

The coupler 122 further includes a trailing portion, generally indicated at 144. The trailing portion 144 is integrated with the leading portion 124 along the merging surface 140. The trailing portion 144 is adapted to operatively receive the adapter of the coupler assembly 120, as will be described in greater detail below. The trailing portion 144 includes a first panel 146 that extends vertically from the merging surface 140 and a second panel 148 that is aligned with respect to the first panel 146 and in proximate relation thereto. The first panel 146 and second panel 148 each includes a breach 150 and 152, respectively that are aligned with respect to each other. The breaches 150 and 152 are adapted to cooperate with an adapter, as will be described in greater detail below, to operatively engage a wiper arm attachment member 32. Those having ordinary skill in the art will appreciate that the breaches 150 and 152 may include a chamfered edge to facilitate positive engagement with a portion of a wiper arm attachment member 32 as will be described in greater detail below. The trailing portion 144 further includes a plurality of braces 154 that extend between the first and second panels 146 and 148, respectively. At least one of the braces 154 includes an identifying member 156 defined thereon to facilitate assembly of the coupler and adapter by the end user. The first and second panels 146 and 148, respectively, cooperate with the braces 154 to define a corridor 158 that operatively receives the adapter, as will be described in greater detail below. To this end, the trailing portion 144 further includes a cross member 160 that extends between the first and second panels 144 and 146, respectively, within the corridor 158 and adjacent to the aligned breaches 150 and 152. The cross member 160 is adapted to operatively engage the adapter of the coupler assembly 120, as will be described in greater detail below.

Referring to FIGS. 2, 3 and 11-17B, the coupler assembly 120 further includes an adapter, generally indicated at 162, that is removably attached to the coupler 122. More specifically, the adapter 162 serves as an adaptive coupling to interconnect the wiper blade assembly 26 to the attachment member 32 of a wiper arm assembly 24. The present invention may be employed as part of a wiper system 22 for use with broad spectrum of vehicles produced by a diverse group of OEMs. In addition, the coupler assembly 120 having an adapter 162 in accordance with the present invention may be employed as a replacement part to an OEM wiper system or as a component of a wiper blade assembly replacement system.

Figure 17A:
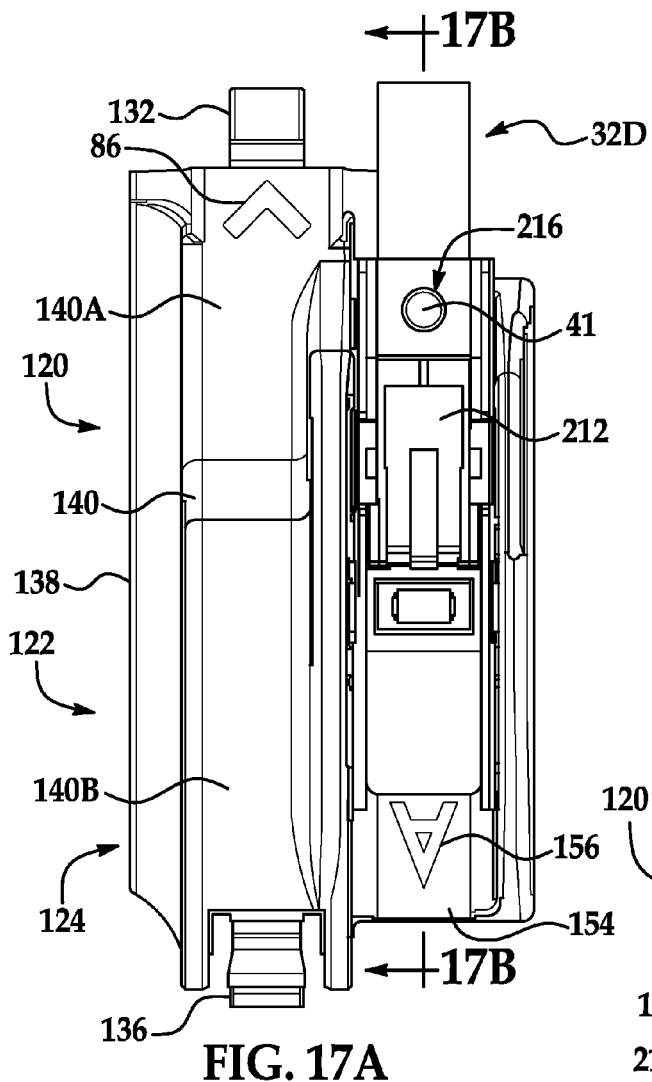
FIG. 17A is a top view of the coupler assembly of the windshield wiper assembly in accordance with the present invention operatively engaged to a bayonet-type wiper arm attachment member.
Figure 17B:
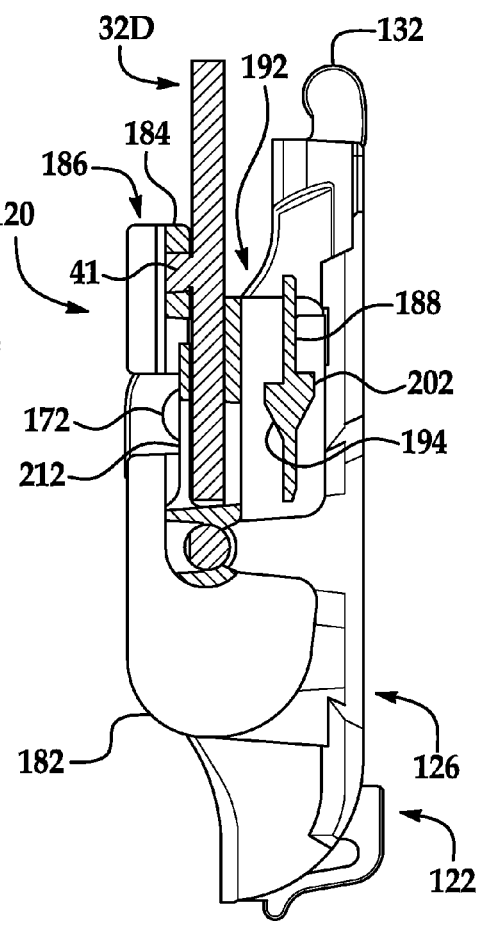
FIG. 17B is a cross-sectional view of the coupler assembly of the windshield wiper assembly in accordance with the present invention operatively engaged to a bayonet-type wiper arm attachment member of the type illustrated in FIG. 17A.

In either event, the adapter 162 of the present invention is adapted to operatively engage the cross member 160 located within the corridor 158 of the coupler 122. To this end and with specific reference to FIGS. 2-4, the adapter 162 includes a pair of sidewalls 164 and 166 each having a nock 168 and 170, respectively, that are aligned with respect to each other. Each nock 168 and 170 has an arcuate rest 172 and 174, respectively, formed at its terminal end. The arcuate rests 172 and 174 include locking members 176 and 178, respectively, that are adapted to releasably engage the cross member 160 of the coupler 122. In addition and as shown throughout the figures, the adapter 162 is adapted to operatively engage several different types of wiper arm attachment members 32, namely hook-type wiper arm attachment members 32A and 32B (FIGS. 14A-15B), pin-type wiper arm attachment members 32C (FIGS. 16A and 16B), and bayonet-type wiper arm attachment members 32D (FIGS. 17A and 17B).

Referring to FIGS. 14A-15B, hook-type wiper arm attachment members 32A and 32B are generally known in the related art and include a curved forward end 33A and 33B having an arcuate inner surface 35A and 35B and a terminal end 37A and 37B with an aperture 39A and 39B. The adapter 162 of the present invention provides operative attachment to different styles of hook-type wiper arm attachment members 32A and 32B of varying sizes (i.e. 7 mm, 9"×3", 9'×4", etc.). To this end, the perimeter of each of the sidewalls 164 and 166 adjacent their respective nock 168 and 179 defines an arcuate surface 180 and 182 that acts to operatively retain at least a portion of the curved forward end 33A and 33B of a hook-type wiper arm attachment member 32A and 32B therebetween (see FIGS. 14A-15B). Those having ordinary skill in the art will appreciate that while the perimeter of the sidewalls 164 and 166 adjacent the nock 168 and 170 include an arcuate surface 180 and 182, different structure that accomplishes the same end may be employed along the perimeter of the sidewalls 164 and 166. By way of example, the perimeter of the sidewalls 164 and 166 may include an octagonal surface that operatively retains a portion of a hook-type wiper arm attachment member 32A and 32B.

Figure 11:
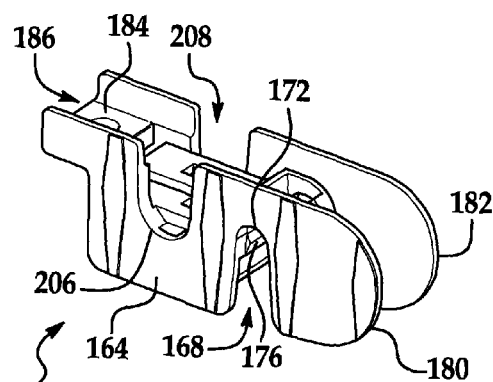
FIG. 11 is a side perspective view of the adapter portion of the coupler assembly in accordance with the present invention.
Figure 12:
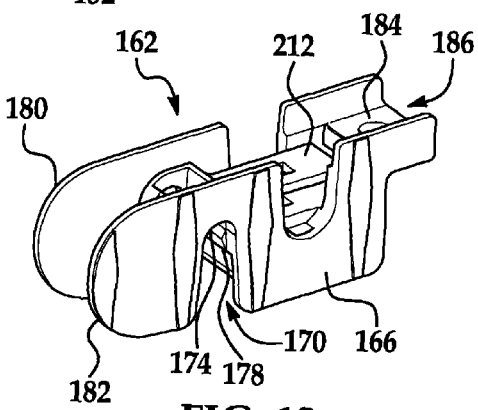
FIG. 12 is an opposite side perspective view of the adapter portion of the coupler assembly in accordance with the present invention.
Figure 13:
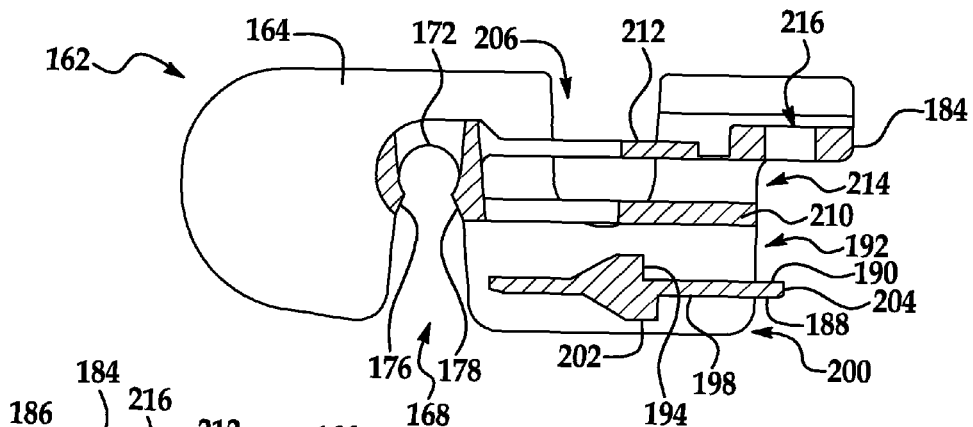
FIG. 13 is a cross-sectional side view of the adapter portion of the coupler assembly in accordance with the present invention.
Figure 14B:
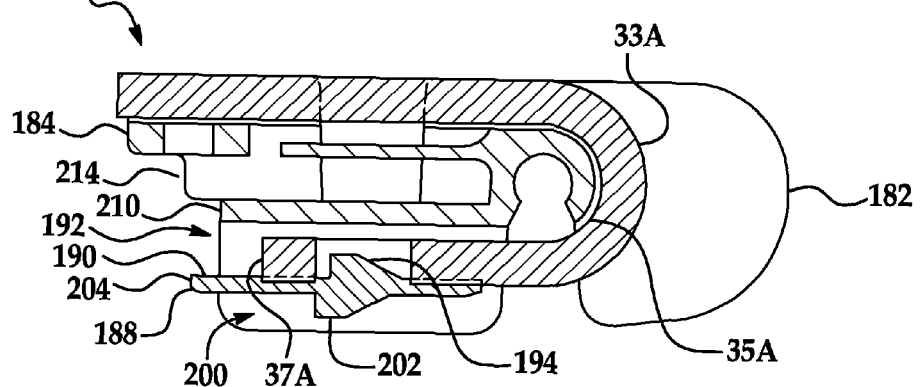
FIG. 14B is a cross-sectional side view of the adapter portion of the coupler assembly in accordance with the present invention operatively engaged to the first hook-type wiper arm attachment member of the type illustrated in FIG. 14A.
Figure 15A:
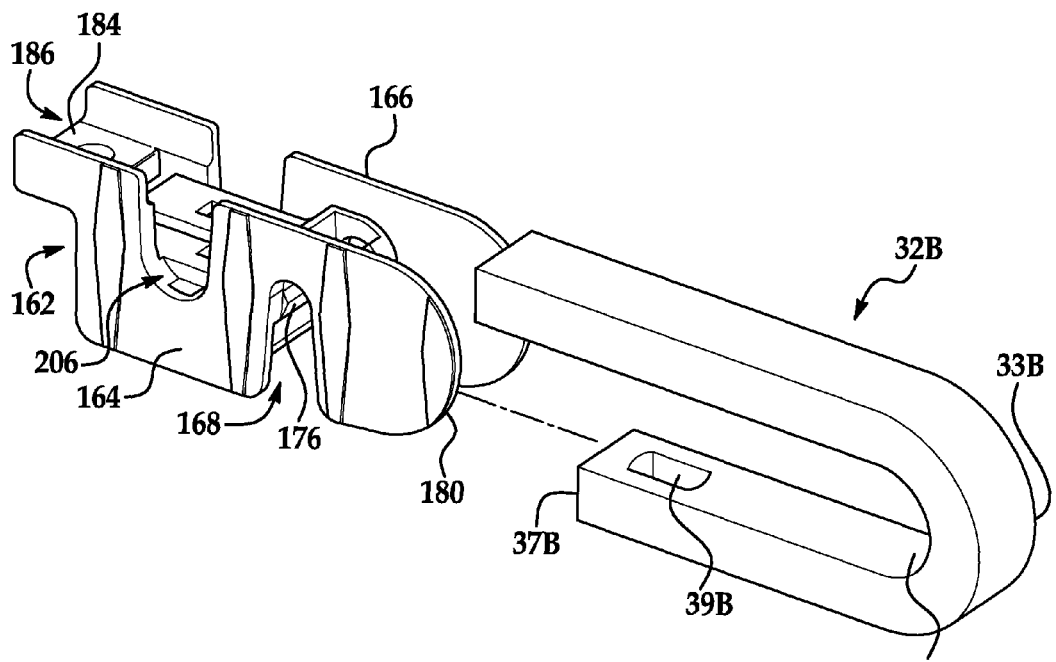
FIG. 15A is an assembly view of the adapter portion of the coupler assembly in accordance with the present invention illustrating the contact location for a second hook-type wiper arm attachment member.
Figure 15B:
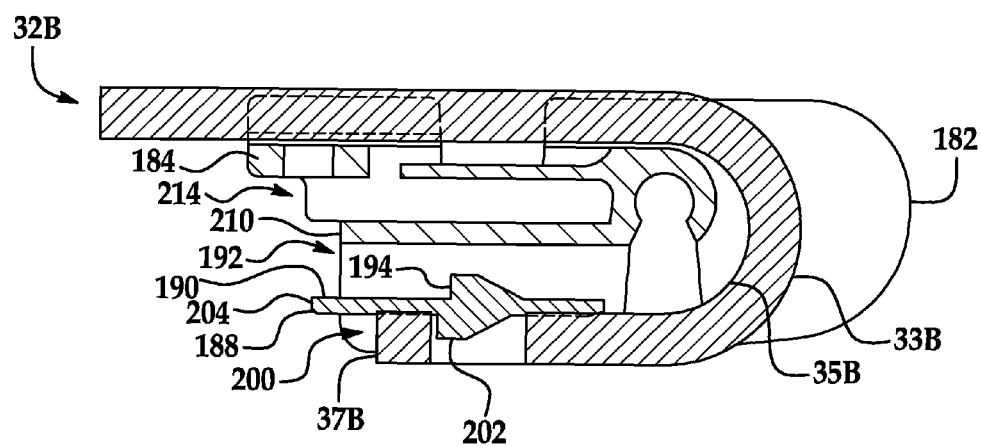
FIG. 15B is a cross-sectional side view of the adapter portion of the coupler assembly in accordance with the present invention operatively engaged to the second hook-type wiper arm attachment member of the type illustrated in FIG. 15A.
Figure 16A:
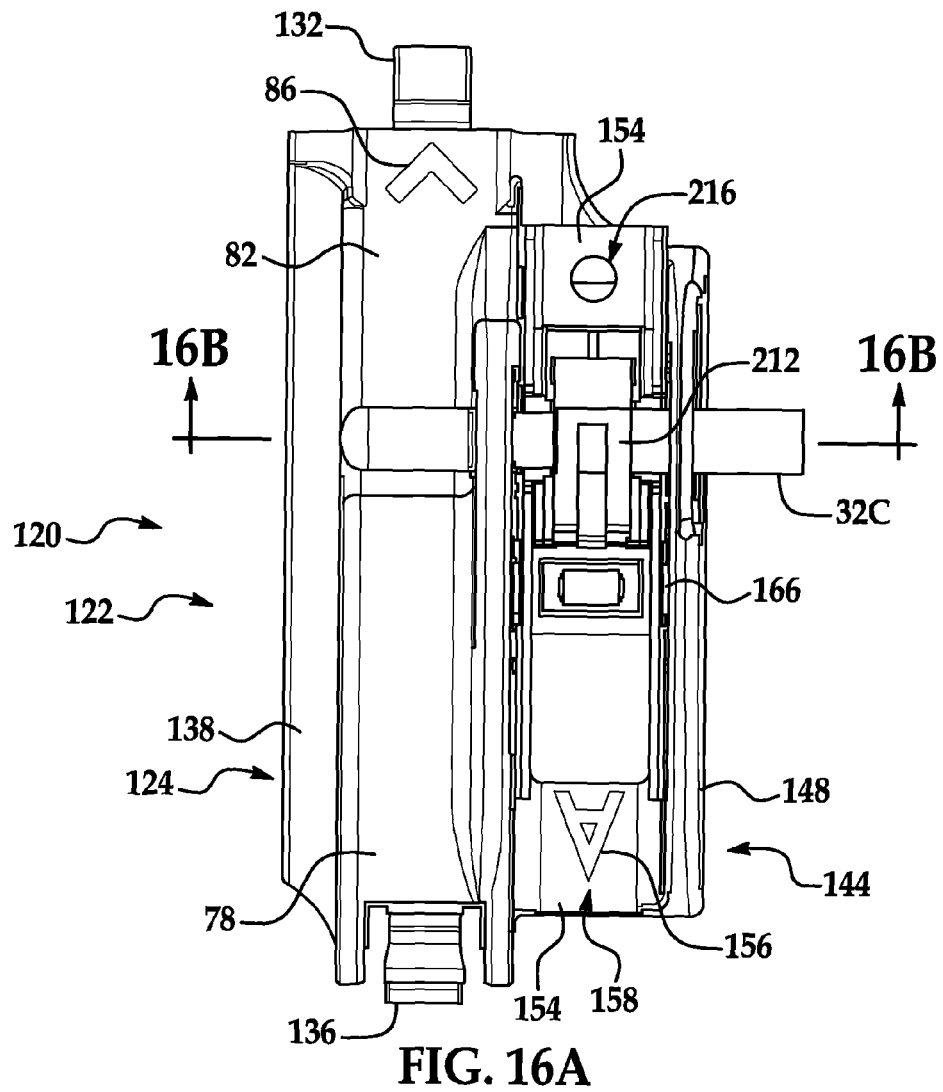
FIG. 16A is a top view of the coupler assembly of the windshield wiper assembly in accordance with the present invention operatively engaged to a pin-type wiper arm attachment member.
Figure 16B:
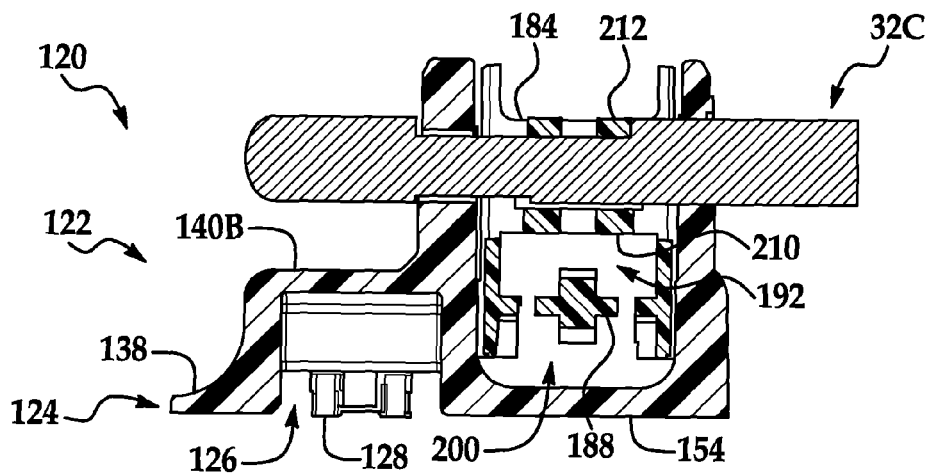
FIG. 16B is a cross-sectional side view of the coupler assembly of the windshield wiper assembly in accordance with the present invention operatively engaged to a pin-type wiper arm attachment member of the type illustrated in FIG. 16A.

Specifically referring to FIGS. 11-13, the adapter 162 includes a land 184 extending between the sidewalls 164 and 166 that cooperates with the sidewalls 164 and 166 to define a channel 186 therebetween. The adapter 162 also includes a cantilevered beam 188 extending between the sidewalls 164 and 166 in spaced parallel relation to the land 184. The cantilevered beam 188 includes a super-surface 190 that cooperates with the sidewalls 164 and 166 to define an elongate passage 192. The super-surface 190 has a catch 194 adapted to operatively engage a first hook-type wiper arm attachment member 32A (FIG. 14B). The catch 194 extends in the direction of the land 184 and is substantially wedge-shaped to facilitate efficient "slide-over" engagement with the aperture 39A of the first hook-type wiper arm attachment member 32A. Those having ordinary skill in the art will appreciate that the catch 194 may include any shape adapted to operatively engage a first hook-type wiper arm attachment member 32A.

Referring now to FIGS. 2, 3, 11-13 and 15A and 15B, the adapter 162 of the present invention further includes structure that operatively engages a second hook-type wiper arm attachment member 32B. To this end, the cantilevered beam 188 further includes a sub-surface 198 that cooperates with the sidewalls 164 and 166 to define an elongate track 200. The sub-surface 198 has a stand 202 adapted to operatively engage a second hook-type wiper arm attachment member 32B. The channel 186 and the elongate track 200 are adapted to cooperatively receive a second hook-type wiper arm attachment member 32B of different sizes provided that the stand 202 engages the aperture 39B of the attachment member 32B. By way of example, the adapter 162 may engage a 9×4×23 hook-type wiper arm attachment member 32B. On the other hand, the adapted 162 may engage a 7 mm or 9×3 hook-type wiper arm attachment member 32A where the catch 194 is capable of engaging the aperture 39A.

As shown in FIG. 13, the cantilevered beam 188 further includes a terminal end 204 that facilitates releasable engagement of both a first and second hook-type wiper arm attachment member 32A and 32B. More specifically, as the first or second hook-type wiper arm attachment member 32A or 32B contacts the catch 194 or stand 202, the cantilevered beam 188 will articulate away from the attachment member 32A or 32B and subsequently return to a substantially parallel orientation relative to the attachment member 32A or 32B once the catch 194 or stand 202 operatively engages the aperture 39A or 39B. Additionally, the terminal end 204 of the cantilevered beam 188 is adapted to be contacted by the end user to release the operative engagement between a first or second attachment member 32A or 32B and the adapter 162. More specifically, the end user will engage the terminal end 204 to articulate the cantilevered beam 188 away from the attachment member 32A or 32B, thereby releasing the catch 194 or stand 202 from the aperture 39A or 39B, and simultaneously direct the adapter 162 (more generally the wiper assembly 26) away from the wiper arm attachment member 32A or 32B. Those having ordinary skill in the art will appreciate that the terminal end 204 of the cantilevered beam 188 may include a flange or bulbous end in order to more readily facilitate the end user's ability to release the wiper arm attachment member 32A or 32B from the adapter 162.

Referring to FIGS. 11-13, 16A and 16B, the adapter 162 of the present invention may operatively engage a pin-type wiper arm attachment member 32C. To this end, the adapter 162 of the present invention further includes a pair of notches 206 and 208 defined within the sidewalls 164 and 166 and a substrate 210 that extends between the sidewalls 164 and 166 in parallel relation to and disposed between the land 184 and the cantilevered beam 188. The substrate 210 cooperates with the land 184 and the notches 206 and 208 to operatively receive at least two different diameter pin-type wiper arm attachment members 32C, namely 3/16" and 1/4" diameter pin-type wiper arm attachment members. More specifically, with reference to FIGS. 11-13, the land 184 has a deck 212 adapted to move in cantilevered fashion to releasably engage a pin-type wiper arm attachment member 32C that is inserted through the a portion of the notches 206 and 208 and between the cantilevered deck 212 and the substrate 210.

Referring now to FIGS. 11-13, 17A and 17B, the wiper adapter 162 of the present invention is also adapted to operatively engage at least one style of a bayonet-type wiper arm attachment member 32D. To this end, the substrate 210 cooperates with the sidewalls 164 and 166 and the land 184 to define an elongate cavity 214 to operatively receive a bayonet-type wiper attachment member 32D. Referring specifically to FIGS. 13, 17A and 17B, the land 184 includes a port 216 disposed between the sidewalls 164 and 166 and adjacent the cantilevered deck 212. The port 216 functions to releasably engage a bayonet-type wiper arm attachment member 32D having a nub 41. While the adapter 162 of the present invention is designed to operatively engage a bayonet-type wiper arm attachment member 32D having a nub 41, those having ordinary skill in the art will appreciate that the adapter 162 may also operatively engage a screw-style bayonet-type wiper arm attachment member (not shown). In those instances where a screw-style bayonet-type wiper arm attachment member is employed, the port 216 will operatively receive the screw member secured to a threaded hole within the screw-style bayonet-type wiper arm attachment member.

The beam blade windshield wiper assembly of the present invention provides a wiper coupler assembly that operatively connects a wiper assembly having a beam blade-style super-structure to a wiper arm attachment member that is conventionally adapted to operatively connect a tournament-style windshield wiper assembly. Accordingly, the wiper assembly of the present invention provides a beam blade windshield wiper assembly as a replacement option to tournament-style windshield wiper assemblies, thereby increasing the availability of beam blade windshield wiper assemblies in the aftermarket.

The adapter 162 of the present invention is preferably manufactured via injection molding and constructed from a polymer, such as plastic. However, the adapter 162 may alternatively be manufactured via cast molding and/or constructed from a lightweight metal, such as aluminum. Additionally, such innovative methods of manufacture and construction material may become known so as to provide a more cost-effective or otherwise preferable approach to construction and/or manufacture of the present invention than those disclosed above. Accordingly, such construction materials and methods of manufacture are within the scope of this invention.

The present invention provides a coupler assembly 120 having an adapter 162 that is designed to operatively engage a plurality of different wiper arm attachment members 32A-D. Accordingly, the present invention is an improvement over couplers/adapters known in the art for use in connection with beam blade windshield wiper assemblies by increasing the number wiper arm attachment members capable of attaching to a beam blade windshield wiper assembly. By increasing the number of wiper arm attachment members capable of attaching to a beam blade windshield wiper assembly, the coupler assembly 120 of the present invention reduces the need to manufacture several different adapters and/or replacement varieties of beam blade windshield wiper assemblies. Accordingly, the present invention provides a coupler assembly 120 that is mechanically efficient and cost effective to manufacture.

The coupler assembly 120 having an adapter 162 of the present invention may also function as a component of a beam blade windshield wiper assembly replacement system. Accordingly, the coupler assembly 120 of the present invention reduces the amount of components packaged within an aftermarket beam blade windshield wiper assembly replacement systems. Further, the present invention simplifies the task of replacing a wiper blade assembly by reducing the need for multiple adapters incorporated within a single aftermarket beam blade windshield wiper assembly replacement system.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A coupler assembly for use in connecting a beam blade wiper assembly to different wiper arm attachment members, said coupler assembly comprising:
    a coupler that is adapted to operatively attach to a beam blade wiper assembly, said coupler having a trailing portion and a leading portion that includes a merging surface to integrate said leading portion with said trailing portion, said trailing portion including a first panel the extends vertically from said merging surface, a second panel that is aligned with respect to said first panel and at least one brace as well as a cross member that extends between said first and second panels, said first and second panels cooperating with said brace to define a corridor; and
    an adapter that is removably attached to said coupler within said corridor, said adapter includes a pair of sidewalls, each having a nock including an arcuate rest and at least one locking member that releasably engages said cross member, each of said sidewalls further having a notch aligned with respect to each other, said adapter further including a land extending between said sidewalls cooperating to define a channel therebetween, said adapter further including a cantilevered beam extending between said sidewalls in parallel relation to said land and including a super-surface cooperating with said sidewalls and said land to define an elongate passage, said channel and said elongate passage cooperating to operatively receive at least one style of a first hook-type wiper arm attachment member, said cantilevered beam further including a sub-surface cooperating with said sidewalls to define an elongate track, said channel and said elongate track cooperating to operatively receive at least one style of a second hook-type wiper arm attachment member, and said wiper adapter further including a substrate extending between said sidewalls in parallel relation to and juxtaposed between said land and said cantilevered beam, said substrate cooperating with said land and said notches to receive at least two different diameter pin-type wiper arm attachment members and further cooperating with said sidewalls and said land to define an elongate cavity adapted to operatively receive at least one style bayonet-type wiper arm attachment member.

2. The coupler assembly as set forth in claim 1 wherein said super-surface further includes a catch adapted to operatively engage a first hook-type wiper arm attachment member and said sub-surface further includes a tab adapted to operatively engage a second hook-type wiper arm attachment member.

3. The coupler assembly as set forth in claim 1 wherein said cantilevered beam further includes a flanged terminal end adapted to facilitate releasable engagement of hook-type wiper arm attachment members.

4. The coupler assembly as set forth in claim 1 wherein the perimeter of said sidewalls adjacent said nocks define a pair of arcuate surfaces to operatively retain at least a portion of the curved forward end of a hook-type wiper arm attachment member therebetween.

5. The coupler assembly as set forth in claim 1 wherein said land further includes a cantilevered deck adapted to move in cantilevered fashion to releasably engage a pin-type wiper arm attachment member that is inserted through said notches and between said cantilevered deck and said substrate.

6. The coupler assembly as set forth in claim 1 wherein said land includes a port adjacent to said cantilevered deck to releasably engage a portion of a bayonet-type wiper arm attachment member.

7. The coupler assembly as set forth in claim 1 wherein said first panel and said second panel each include a breach that cooperate with said notches to operatively receive a portion of a pin-type wiper arm attachment member.

8. The coupler assembly as set forth in claim 1 wherein said coupler includes a cross member that extends between said first and second panels, within said corridor, and operatively engages said nocks to provide a structure about which said adapter is adapted to pivot.

9. A wiper blade system for use in connection with wiper arms having different wiper arm attachment members comprising:
    a wiper blade assembly including a wiping element to contact the surface to be wiped, at least one elongated beam having longitudinal ends that define a predetermined length, a carrier that is operatively engaged to said elongated beam between said longitudinal ends, and an airfoil that is operatively disposed adjacent to said carrier and adapted to operatively connect said elongated beam and said wiping element;
    a coupler assembly having a coupler that is adapted to operatively engage said carrier and an adapter that is removably attached to said coupler, said coupler having a tab and a locking tang that cooperate to removably secure said coupler to said carrier and a corridor having a cross member extending therethrough that operatively receives said adapter; and
    said adapter including a pair of sidewalls, each sidewall having a nock including an arcuate rest and at least one locking member that releasably engage said cross member, each of said sidewalls further having a notch aligned with respect to each other, said adapter further including a land extending between said sidewalls cooperating to define a channel therebetween, said adapter further including a cantilevered beam extending between said sidewalls in parallel relation to said land and including a super-surface cooperating with said sidewalls and said land to define an elongate passage, said channel and said elongate passage cooperating to operatively receive at least one style of a first hook-type wiper arm attachment member, said cantilevered beam further including a sub-surface cooperating with said sidewalls to define an elongate track, said channel and said elongate track cooperating to operatively receive at least one style of a second hook-type wiper arm attachment member, and said wiper adapter further including a substrate extending between said sidewalls in parallel relation to and juxtaposed between said land and said cantilevered beam, said substrate cooperating with said land and said notches to receive at least two different diameter pin-type wiper arm attachment members and further cooperating with said sidewalls and said land to define an elongate cavity adapted to operatively receive at least one style bayonet-type wiper arm attachment member.

10. The wiper blade system as set forth in claim 9 wherein said super-surface further includes a catch adapted to operatively engage a first hook-type wiper arm attachment member and said sub-surface further includes a tab adapted to operatively engage a second hook-type wiper arm attachment member.

11. The wiper blade system as set forth in claim 9 wherein said cantilevered beam further includes a flanged terminal end adapted to facilitate releasable engagement of hook-type wiper arm attachment members.

12. The wiper blade system as set forth in claim 9 wherein the perimeter of said sidewalls adjacent said nocks define a pair of arcuate surfaces that operatively retain at least a portion of the curved forward end of a hook-type wiper arm attachment member therebetween.

13. The wiper blade system as set forth in claim 9 wherein said land further includes a cantilevered deck adapted to move in cantilevered fashion to releasably engage a pin-type wiper arm attachment member that is inserted through said notches and between said cantilevered deck and said substrate.

14. The wiper blade system as set forth in claim 9 wherein said coupler includes a trailing portion having a first panel and a second panel that is aligned with respect to said first panel, each of said panels include a breach that cooperates with said notches to operatively receive a portion of a pin-type wiper arm attachment member.

15. The wiper blade system as set forth in claim 9 wherein said land further includes a cantilevered deck that is adapted to move in a cantilevered fashion to releasably engage a pin-type wiper arm attachment member.

16. A wiper blade system for use in connection with a wiper arms having different wiper arm attachment members comprising:

a wiper blade assembly including a wiping element to contact the surface to be wiped, at least one elongated beam having longitudinal ends that define a predetermined length, a carrier that is operatively engaged to said elongated beam between said longitudinal ends, and an airfoil that is operatively disposed adjacent to said carrier and adapted to operatively connect said elongated beam and said wiping element, said carrier having a high-profile end, a low-profile end and a saddle that is disposed between said high-profile end and said low-profile end;

a coupler assembly having a coupler that is adapted to operatively engage said saddle and an adapter that is removably attached to said coupler, said coupler having a tab and a locking tang that cooperate to removably secure said coupler to said carrier, said coupler further including a first panel and a second panel having a cross member extending therebetween, said first and second panels cooperate to define a corridor that operatively receives said adapter; and said adapter including a pair of sidewalls, each sidewall having a nock including an arcuate rest and at least one locking member that releasably engage said cross member, each of said sidewalls further having a notch aligned with respect to each other, said adapter further including a land extending between said sidewalls cooperating to define a channel therebetween, said adapter further including a cantilevered beam extending between said sidewalls in parallel relation to said land and including a super-surface cooperating with said sidewalls and said land to define an elongate passage, said channel and said elongate passage cooperating to operatively receive at least one style of a first hook-type wiper arm attachment member, said cantilevered beam further including a sub-surface cooperating with said sidewalls to define an elongate track, said channel and said elongate track cooperating to operatively receive at least one style of a second hook-type wiper arm attachment member, and said wiper adapter further including a substrate extending between said sidewalls in parallel relation to and juxtaposed between said land and said cantilevered beam, said substrate cooperating with said land and said notches to receive at least two different diameter pin-type wiper arm attachment members and further cooperating with said sidewalls and said land to define an elongate cavity adapted to operatively receive at least one style bayonet-type wiper arm attachment member.

* * * * *